US012593157B2

(12) United States Patent

Kim et al.

(10) Patent No.: US 12,593,157 B2

(45) Date of Patent: Mar. 31, 2026

(54) MICROPHONE PROTECTING DEVICE

(71) Applicant: BSE CO., LTD., Incheon (KR)

(72) Inventors: Jin Sun Kim, Incheon (KR); Won Taek Lee, Incheon (KR); Byung Wook Hwang, Cheongju-si (KR)

(73) Assignee: BSE CO., LTD., Incheon (KR)

( * ) Notice: Subject to any disclaimer, the term of this patent is extended or adjusted under 35 U.S.C. 154(b) by 168 days.

(21) Appl. No.: 18/567,078

(22) PCT Filed: Apr. 26, 2022

(86) PCT No.: PCT/KR2022/005917

§ 371 (c)(1),
(2) Date: Dec. 5, 2023

(87) PCT Pub. No.: WO2022/260274

PCT Pub. Date: Dec. 15, 2022

(65) Prior Publication Data

US 2024/0267662 A1 Aug. 8, 2024

(30) Foreign Application Priority Data

Jun. 7, 2021 (KR) ........................ 10-2021-0073745

(51) Int. Cl.
*H04R 1/08* (2006.01)

(52) U.S. Cl.
CPC .................................... *H04R 1/086* (2013.01)

(58) Field of Classification Search
CPC ...................................................... H04R 1/086
USPC .................................. 381/87, 345, 355, 361
See application file for complete search history.

(56) References Cited

U.S. PATENT DOCUMENTS

| | | | | |
|---|---|---|---|---|
| 2004/0145056 | A1 * | 7/2004 | Gabriel | H01G 5/16 257/758 |
| 2007/0017077 | A1 * | 1/2007 | Yonehara | H04R 31/006 29/25.41 |
| 2021/0076141 | A1 * | 3/2021 | Lee | H04R 19/005 |

FOREIGN PATENT DOCUMENTS

| | | |
|---|---|---|
| CN | 105611012 | 5/2016 |
| JP | 2006186422 | 7/2006 |
| JP | 2011217286 | 10/2011 |
| KR | 20050078324 | 8/2005 |
| KR | 20080068349 | 7/2008 |

* cited by examiner

*Primary Examiner* — George C Monikang

(74) *Attorney, Agent, or Firm* — LEX IP MEISTER, PLLC

(57) ABSTRACT

An example embodiment of present disclosure discloses a microphone protection device capable of preventing performance degradation or damage to a microphone mounted on a mobile device, vehicle, or the like from a momentary high-pressure compressed air or high-pressure sprayed liquid. A disclosed protection device may include: a fixture formed with a through-hole that supports the microphone and leads to the microphone's sound opening, and a mounting compartment for mounting a protection device; an inner plate mounted in the mounting compartment of the fixture and having a sound hole formed in the center; an outer plate mounted in the mounting compartment of the fixture and having a plurality of sound holes formed on its outer circumference; and a plurality of springs disposed between the inner and outer plates.

4 Claims, 8 Drawing Sheets

MICROPHONE PROTECTING DEVICE

TECHNICAL FIELD

The present disclosure relates to a microphone protecting device, and more particularly to a microphone protecting device capable of preventing performance degradation or damage to a microphone mounted on a mobile device, a vehicle, or the like from momentary high-pressure compressed air or high-pressure sprayed liquid.

DESCRIPTION OF THE RELATED ART

In general, microphones are operated by the vibration of a diaphragm that is sensitive to sound pressure, so it has a structure that makes it easy for foreign objects to enter through the sound path to the diaphragm. Therefore, a screen is usually installed at the entrance of the sound path to prevent foreign objects from entering the microphone.

However, since microphones mounted on mobile devices and vehicles are often exposed to harsh external environments such as momentary high-pressure compressed air or high-pressure sprayed liquids, it has an issue that screens in the related art may not protect the diaphragm, causing it to break or degrade. In other words, in the finished product assembly process, user environment, and vehicle driving environment where microphones are used, if high-pressure compressed air is generated or liquid is sprayed momentarily, the diaphragm of the microphone is affected, in which results in poor performance or silence.

DISCLOSURE OF THE INVENTION

Technical Goals

The present disclosure is proposed to solve the above matters, and the present disclosure is for the purpose of providing a microphone protection device to prevent performance degradation and damage of a microphone mounted on a mobile device or a vehicle from momentary compressed air, high-pressure sprayed water, dust while driving, and the like.

Technical Solutions

Example embodiments of the present disclosure disclose a microphone protection device for a mobile device, vehicle, or the like. A disclosed protection device may include: a fixture formed with a through-hole that supports the microphone and leads to the microphone's sound opening, and a mounting compartment for mounting a protection device; an inner plate mounted in the mounting compartment of the fixture and having a sound hole formed in the center; an outer plate mounted in the mounting compartment of the fixture and having a plurality of sound holes formed on its outer circumference; and a plurality of springs disposed between the inner and outer plates, and it is characterized in that, in a normal state, the inner plate and the outer plate are separated by the spring to form a sound path, and when high-pressure compressed air or sprayed liquid is introduced, the outer plate is closely pressed against the inner plate to close the sound path.

The microphone protection device may further include a sealing rubber and a mesh sound filter disposed on an outer side of the inner plate, and the fixture is a fixture for mounting a microphone assembly on a mobile device or vehicle.

Effects

According to an example embodiment of the present disclosure, in a microphone module for a mobile device or a vehicle, it is possible to prevent a diaphragm from being damaged or degraded by high-pressure sprayed water or compressed air, and to prevent a diaphragm from being damaged by dust introduced when driving.

DETAILED DESCRIPTION FOR CARRYING OUT THE INVENTION

The present disclosure and the technical challenges achieved by its implementation will become clearer by reference to the following described preferred example embodiments of the disclosure. The following example embodiments are merely illustrative of the disclosure and are not intended to limit the scope of the disclosure.

Figure 1:
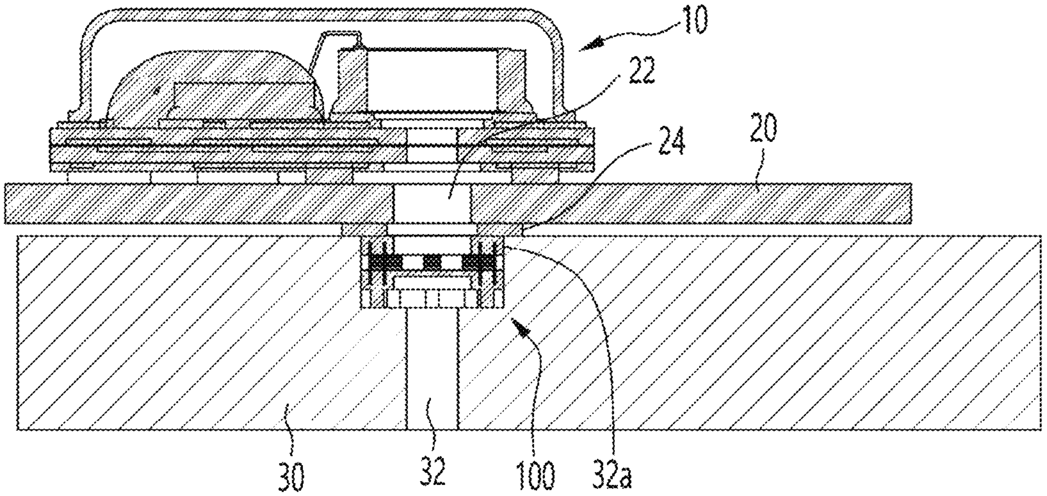
FIG. 1 is an example of a microphone protection device according to an example embodiment of the disclosure applied to a mobile device.
Figure 2:
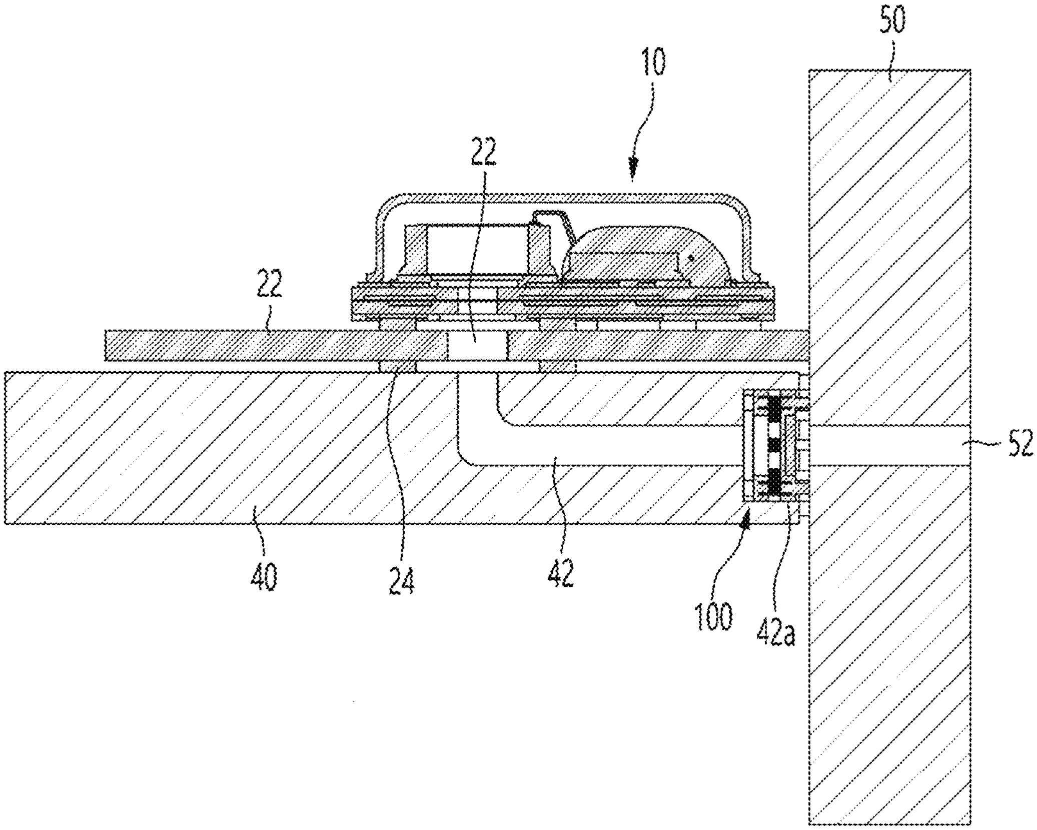
FIG. 2 is an example of a microphone protection device according to an example embodiment of the disclosure applied to a vehicle.

FIG. 1 is an example of a microphone protection device according to an example embodiment of the disclosure applied to a mobile device, and FIG. 2 is an example of a microphone protection device according to an example embodiment of the disclosure applied to a vehicle.

The microphone protection device 100 of the present disclosure is disposed in the mounting compartment 32*a*, 42*a* of the through-holes 32, 42 formed in the fixture 30, 40 of the mobile device or vehicle on which the microphone assembly 10 is mounted, as shown in FIGS. 1 and 2, and functions to protect the microphone assembly 10 from high-pressure compressed air and liquid flow that momentarily enters the microphone side through the through-holes 32, 42 from the outside of the mobile device or vehicle. In example embodiments of the present disclosure, the microphone side is referred to as the inner side and the sound source side is referred to as the outer side in the fixture 30, 40 on which the microphone protection device 100 is mounted.

Referring to FIGS. 1 and 2, the microphone assembly 10 is mounted on a PCB substrate 20 and receives sound input through a sound aperture 22 of the PCB substrate, and a screen 24 may be installed between the sound aperture 22 of the PCB substrate and the fixture 30, 40 to prevent foreign objects from entering. The microphone assembly 10 is a microphone in the related art including a diaphragm, which converts the vibration of the diaphragm into an electrical signal.

In the mobile device fixture 30, a straight type through-hole 32 is formed so that the protection device 100 is mounted in the mounting compartment 32*a* on the inner surface of the fixture 30, and in the vehicle fixture 40, an L-shaped through-hole 42 is formed so that the protection device 100 is mounted in the mounting compartment 42*a* on the outer surface, and the protection device 100 is prevented from being dislodged by the additional vehicle fixture 50. In this case, the through-holes 32, 42 of the fixture that serves as a sound path are formed as cylindrical holes with a small diameter, and a part of the diameter is expanded to form the mounting compartment 32*a*, 42*a* so that the protection device 100 may be mounted.

In such a structure, the microphone assembly 10 mounted on the mobile device receives sound pressure generated from an external sound source in a normal state (open state) through the through-hole 32 of the fixture 30, the protection device 100, and the screen 24 to the inlet, and the sound pressure vibrates the internal diaphragm to generate an audio signal. In addition, the microphone assembly 10 mounted on the vehicle receives sound pressure generated from an external sound source in a normal state (open state) through the through-hole 52 of the secondary fixture 50, the through-hole 42 of the fixture 40, the protection device 100, and the screen 24 to the inlet, and the sound pressure vibrates the internal diaphragm to generate an audio signal.

If high-pressure compressed air or sprayed liquid is momentarily introduced into the through-holes 32, 42 from the outside, the protection device 100 according to an example embodiment of the present disclosure may operate to block the introduction of the high-pressure compressed air or sprayed liquid, thereby protecting the microphone assembly 10.

As such, the microphone protection device 100 according to an example embodiment of the present disclosure is a structure that may close the open sound path P1 in response to compressed air or liquid flow with strong straightness, and when the compressed air or liquid flow disappears after closing the open sound path, it may be restored to a normal state (open state) by the restoring force of the spring. At this time, the sound path P1 is equipped with a mesh that prevents the inflow of dust and moisture to prevent microphone damage and performance degradation.

Figure 3:
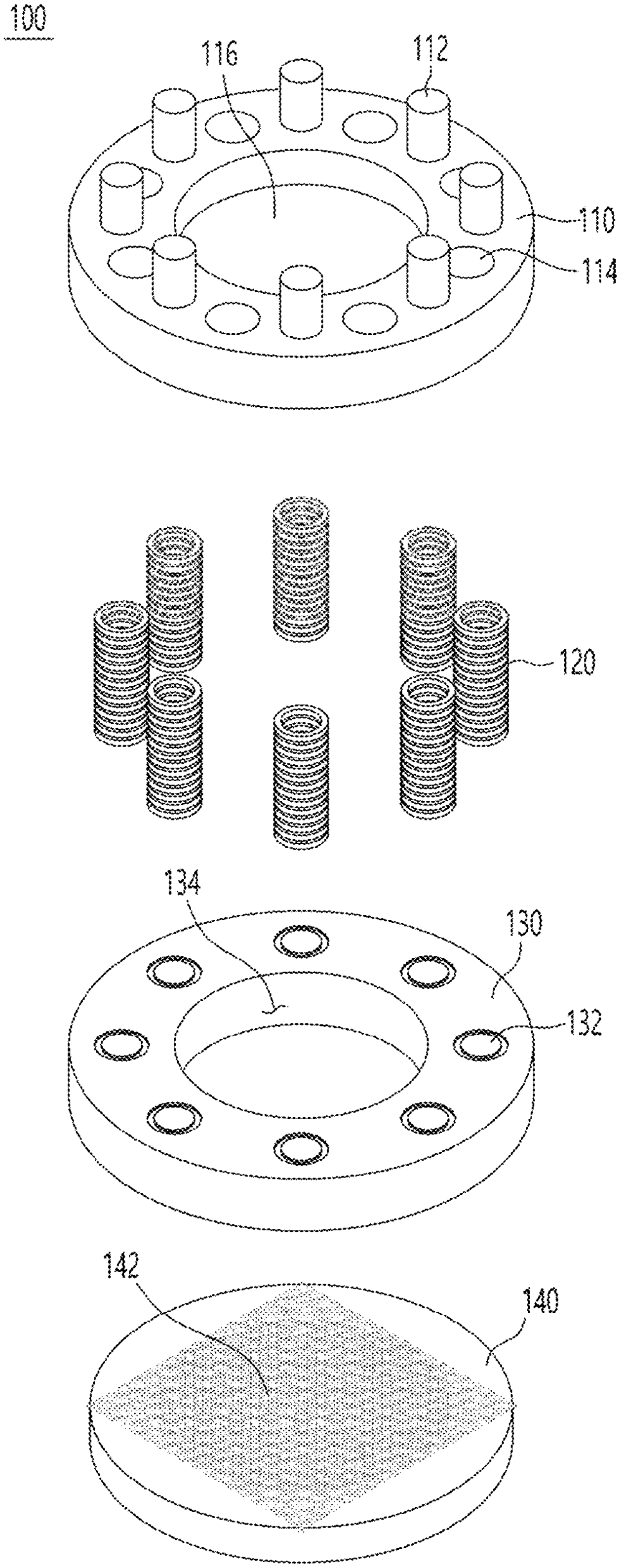
FIG. 3 is an exploded perspective view of a microphone protection device according to an example embodiment of the disclosure.
Figure 4:
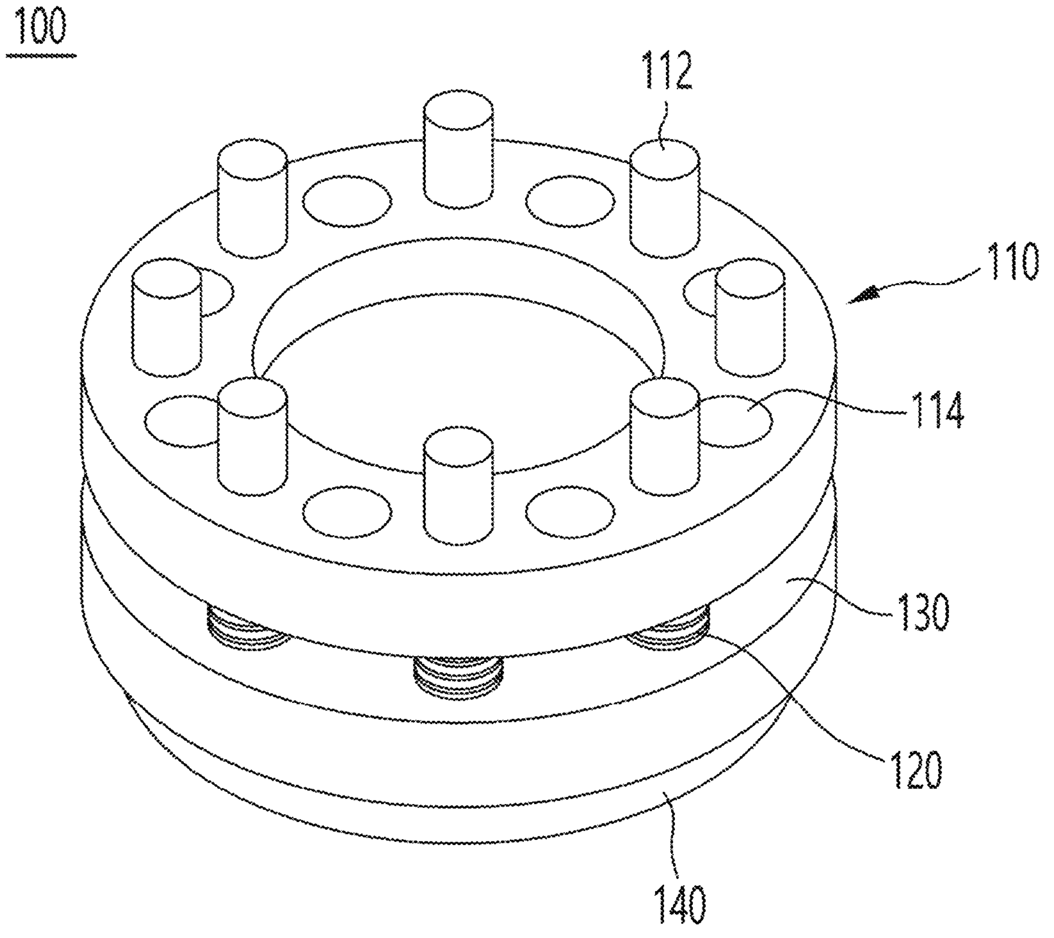
FIG. 4 is an assembled perspective view of a microphone protection device according to an example embodiment of the disclosure.

FIG. 3 is an exploded perspective view of a microphone protection device according to an example embodiment of the disclosure and FIG. 4 is an assembled perspective view of a microphone protection device according to an example embodiment of the disclosure.

The microphone protection device 100 according to an example embodiment of the present disclosure has a structure that an outer plate 110 having a center blocked and a sound hole formed on the outer peripheral surface, an inner plate 130 having a spring mounting groove formed on the outer peripheral surface and a sound hole formed in the center, and a spring 120 disposed between the inner plate 130 and the outer plate 110 are mounted in the mounting compartment 32*a*, 42*a* of the fixture, as shown in FIGS. 3 and 4. At this time, the outer side of the inner plate 130 may be further provided with a sound filter 140 to prevent foreign objects from entering the microphone 10 through a sound hole 134 formed in the center. The sound filter 140 comprises a disc-shaped rubber for sealing with a sound hole formed in the center, and a mesh 142 attached to the sound hole.

Referring to FIGS. 3 and 4, the outer plate 110 is disc-shaped with a closed center 116 and alternating sound holes 114 and support protrusions 112 formed on the outer circumferential surface. The sound holes 114 are sound paths for transmitting the sound of an external sound source to the inner side, and the support protrusions 112 protruding outwardly are spaced apart from the outer side to prevent the sound holes 114 formed on the outer circumferential surface from being blocked.

The springs 120 fit into a plurality of spring mounting grooves 132 formed in the outer plate 110 and inner plate 130, respectively, to form a space between the outer plate 110 and the inner plate 130 such that sound entering through a sound hole 114 in the outer plate is transmitted to the microphone assembly 10 through a sound hole 134 formed in the center of the inner plate 130. These springs 120 are compressed by the outer plate 110 when a high-pressure compressed air or liquid is momentarily sprayed from the outside, causing the outer plate 110 and the inner plate 130 to come into close contact, so that the sound hole 114 formed on the outer peripheral surface of the outer plate 110 is blocked by the inner plate 130 to prevent the high-pressure compressed air or liquid from being transmitted to the microphone 10.

The inner plate 130 is a disc plate with a sound hole 134 formed in the center and a plurality of grooves 132 formed on the outer circumferential surface for holding a portion of the spring 120.

The sound filter 140 is a sealing plate made of a silicon-based material with a sound hole formed in the center, and a mesh 142 is attached to the sound hole to prevent the foreign object from entering.

Figure 5:
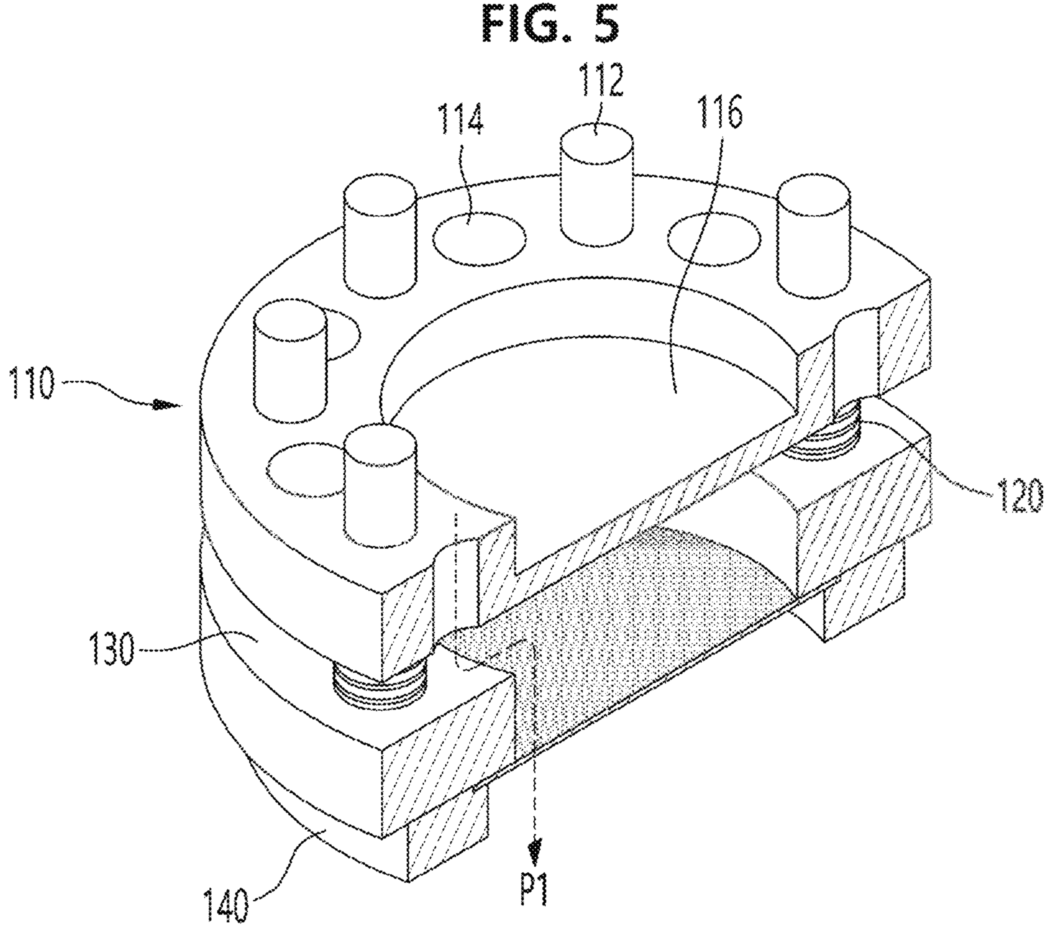
FIG. 5 is an open-state perspective view of a microphone protection device according to an example embodiment of the present disclosure.
Figure 6:
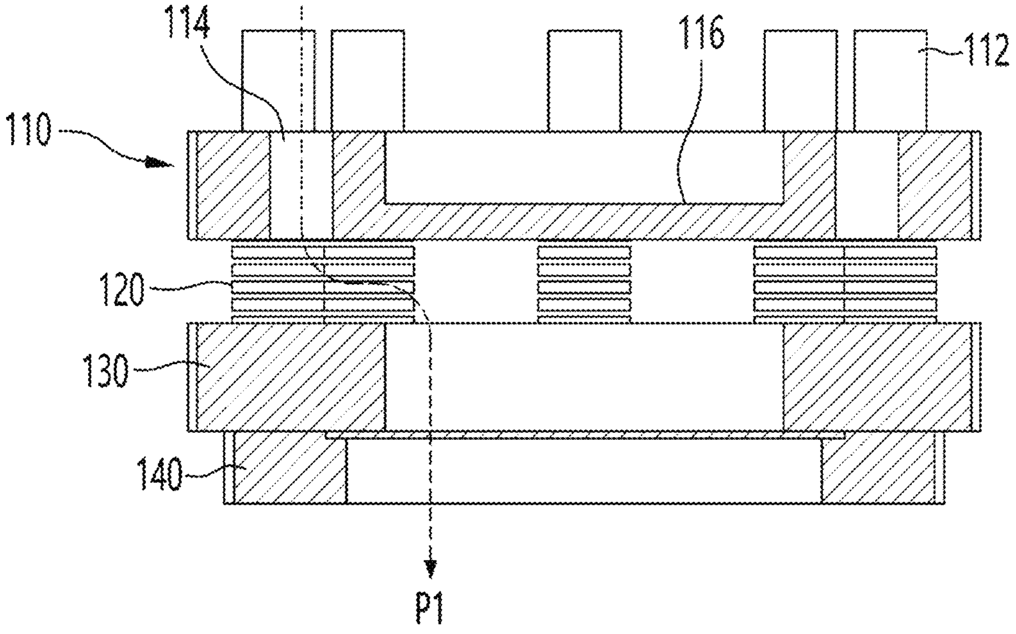
FIG. 6 is an open-state side view of a microphone protection device according to an example embodiment of the present disclosure.
Figure 7:
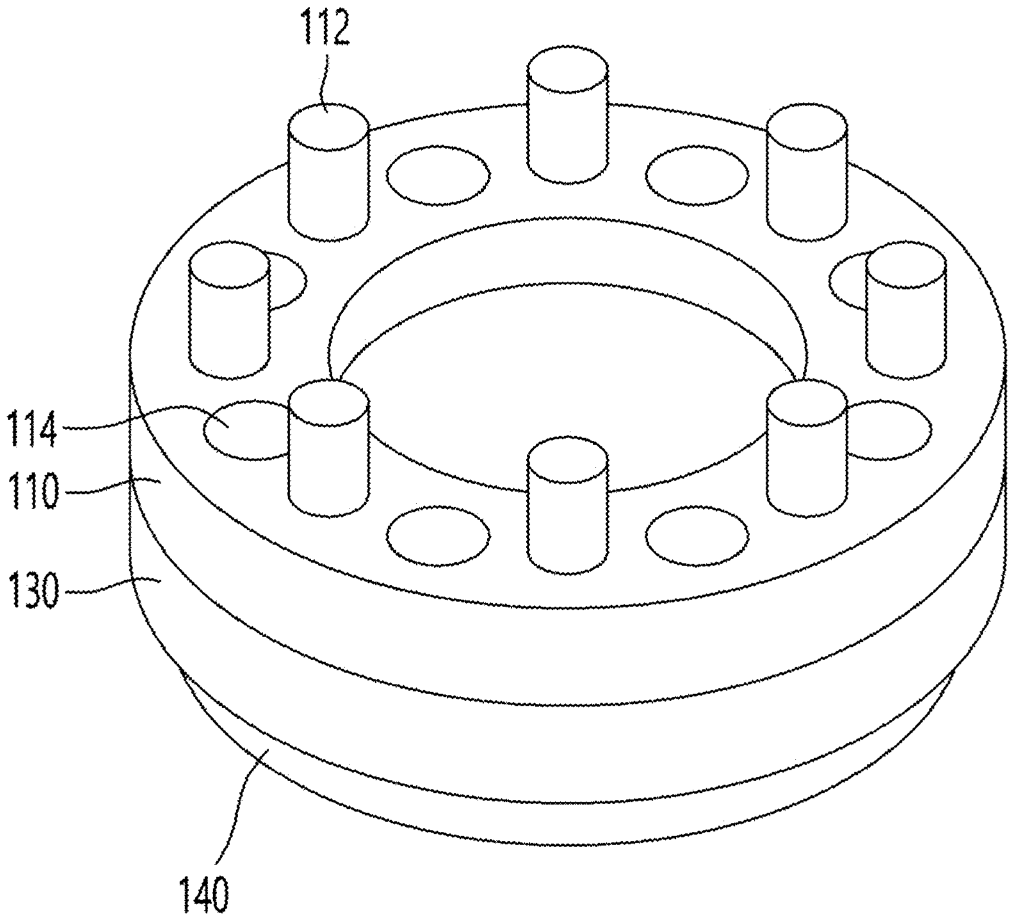
FIG. 7 is a closed-state perspective view of a microphone protection device according to an example embodiment of the present disclosure.
Figure 8:
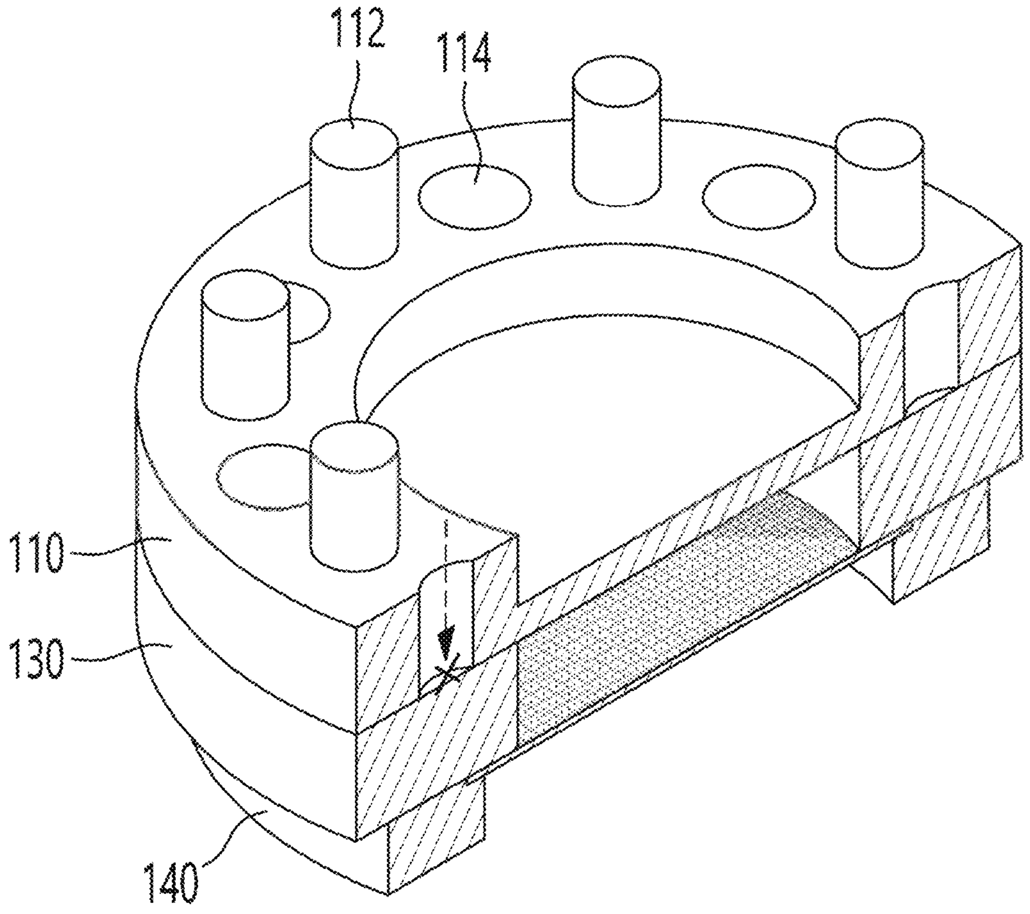
FIG. 8 is a closed-state perspective view of a microphone protection device according to an example embodiment of the present disclosure.
Figure 9:
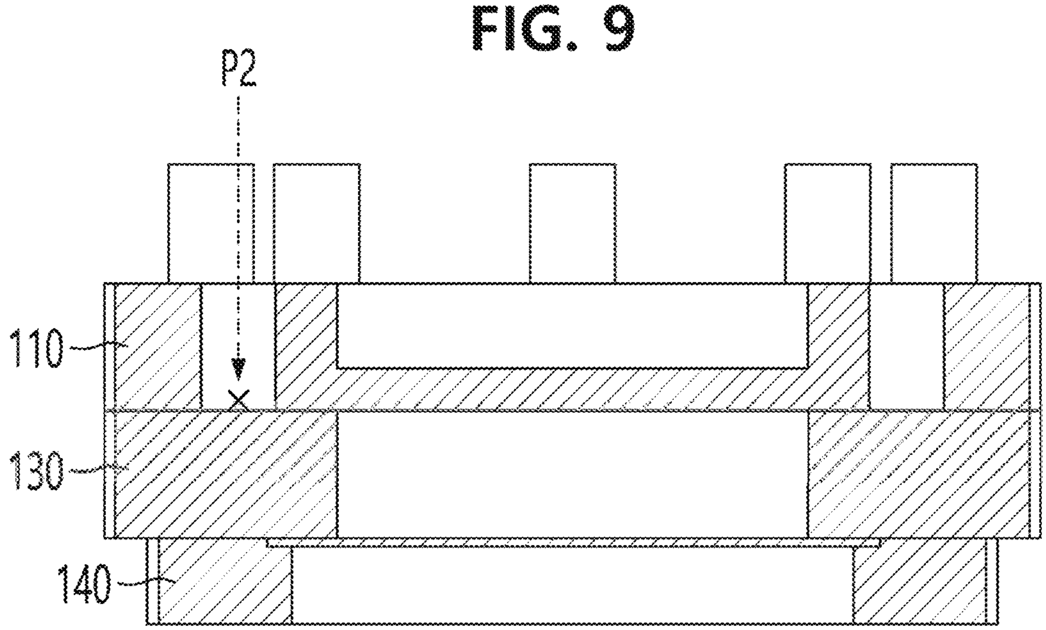
FIG. 9 is a closed-state side view of a microphone protection device according to an example embodiment of the present disclosure.

The microphone protection device 100 according to an example embodiment of the present disclosure thus configured is such that in a normal state, the outer plate 110 and the inner plate 130 are separated by the spring 120 as shown in FIGS. 5 and 6, but when high-pressure compressed air or a sprayed liquid is rapidly introduced from the outside, the outer plate 110 presses against the inner plate 130 to close the sound path P2 to protect the microphone assembly 10 as shown in FIGS. 7 to 9. When the high-pressure compressed air or sprayed liquid from the outside disappears, the elastic force of the spring 120 causes the outer plate 110 to fall away from the inner plate 130, and the sound path P1 is restored to its normal state.

FIG. 5 is an open-state perspective view of a microphone protection device according to an example embodiment of the present disclosure, FIG. 6 is an open-state side view of a microphone protection device according to an example embodiment of the present disclosure, FIG. 7 is a closed-state perspective view of a microphone protection device according to an example embodiment of the present disclosure, FIG. 8 is a closed-state perspective view of a microphone protection device according to an example embodiment of the present disclosure, and FIG. 9 is a closed-state side view of a microphone protection device according to an example embodiment of the present disclosure.

In a normal state where no high-pressure compressed air or sprayed liquid are generated, as shown in FIGS. 5 and 6, the spring 120 is stretched to maintain a gap between the outer plate 110 and the inner plate 130, thereby the sound path P1 leading through the sound hole 114 in the outer plate 110, the space between the outer plate 110 and the inner plate 130 maintained by the spring 120, and the sound hole 130 formed in the center of the inner plate, so that the sound pressure generated by an external sound source is transmitted to the diaphragm of the microphone 10 through the sound path P1.

When an momentarily high-pressure compressed air or sprayed liquid is introduced from the outside, as shown in FIGS. 7 to 9, an momentarily high pressure is applied to the center portion of the outer plate 110, and the spring 120 is squeezed, so that the outer plate 110 and the inner plate 130 are pressed together, and accordingly, the sound hole 114 formed on the outer peripheral surface of the outer plate 110 is blocked by the outer peripheral surface of the inner plate 130, and the sound path P2 is closed, thereby protecting the microphone assembly 10 by blocking the momentarily generated high-pressure compressed air or sprayed liquid from entering through the sound path P2. Then, when the high-pressure compressed air or spray liquid from the outside disappears, the outer plate 110 is restored to its original position by the elastic force of the spring 120 and maintains the space with the inner plate 130, so that the sound path P1 is restored to normal.

As such, the microphone protection device 100 according to an example embodiment of the present disclosure is capable of opening or closing the sound path P1 through which sound passes so that performance degradation factors that may be generated by the user or the driving environment are not directly transmitted to the microphone 10. In other words, the microphone protection device 100 according to an example embodiment of the present disclosure allows, by the spring structure, normal sound to be transmitted to the diaphragm of the microphone 10 through the sound path P1 formed in the fixture, and the performance degradation factors that occur momentarily are blocked by closing the open sound path P2, so that the microphone 10 may be used more reliably.

The disclosure has been described above with reference to one example embodiment illustrated in the drawings, but one of ordinary skill in the art will recognize that various modifications and equally valid other example embodiments are possible.

What is claimed is:

1. A microphone protection device, comprising:

a fixture formed with a through-hole that supports the microphone and leads to the microphone's sound opening, and a mounting compartment for mounting a protection device;

an inner plate mounted in the mounting compartment of the fixture and having a sound hole formed in the center;

an outer plate mounted in the mounting compartment of the fixture and having a plurality of sound holes formed on its outer circumference; and a plurality of springs disposed between the inner and outer plates, wherein it is characterized in that, in a normal state, the inner plate and the outer plate are separated by the spring to form a sound path, and when high-pressure compressed air or sprayed liquid is introduced, the outer plate is closely pressed against the inner plate, thereby the inner plate blocking the plurality of sound holes to close the sound path.

2. The microphone protection device of claim 1, further comprising a sealing rubber and a mesh sound filter disposed on an outer side of the inner plate.

3. The microphone protection device of claim 1, characterized in that the fixture is a fixture for mounting a microphone assembly on a mobile device or vehicle.

4. The microphone protection device of claim 2, characterized in that the fixture is a fixture for mounting a microphone assembly on a mobile device or vehicle.

* * * * *